United States Patent
Gaberthuel

(10) Patent No.: US 10,401,206 B2
(45) Date of Patent: Sep. 3, 2019

(54) THERMAL, FLOW MEASURING DEVICE

(71) Applicant: Endress + Hauser Flowtec AG, Reinach (CH)

(72) Inventor: Stephan Gaberthuel, Oberwil (CH)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 122 days.

(21) Appl. No.: 15/537,912

(22) PCT Filed: Nov. 18, 2015

(86) PCT No.: PCT/EP2015/076927
§ 371 (c)(1),
(2) Date: Jun. 20, 2017

(87) PCT Pub. No.: WO2016/102124
PCT Pub. Date: Jun. 30, 2016

(65) Prior Publication Data
US 2017/0356774 A1   Dec. 14, 2017

(30) Foreign Application Priority Data
Dec. 23, 2014 (DE) .......................... 10 2014 119 556

(51) Int. Cl.
*G01F 1/684* (2006.01)
*G01F 1/69* (2006.01)

(52) U.S. Cl.
CPC .......... *G01F 1/6842* (2013.01); *G01F 1/6847* (2013.01); *G01F 1/69* (2013.01)

(58) Field of Classification Search
CPC .......... G01F 1/68; G01F 1/684; G01F 1/6842; G01F 1/6847; G01F 1/69
See application file for complete search history.

(56) References Cited

U.S. PATENT DOCUMENTS 5,081,866 A * 1/1992 Ochiai ................. A61B 5/0878
                                                    600/537
6,637,264 B2 * 10/2003 Lotters ................. G01F 1/6847
                                                    73/204.27

(Continued)

FOREIGN PATENT DOCUMENTS

CN    101900588 A    12/2010
DE    3210888 A1    9/1983

(Continued)

OTHER PUBLICATIONS

German Search Report, German Patent Office, Munich, DE, dated Aug. 11, 2015.

(Continued)

*Primary Examiner* — Justin N Olamit
(74) *Attorney, Agent, or Firm* — Bacon & Thomas, PLLC

(57) ABSTRACT

A thermal, flow measuring device for determining and/or monitoring a mass flow of a measured medium, comprising a sensor element (1, 11, 21) having a measuring tube (2, 12, 22) with a tube wall (7, 17, 27) and with at least a first and a second temperature sensor element, which are especially embodied as resistance thermometers (3, 13, 23, 33), wherein at least one of the temperature sensor elements is heatable, wherein the measuring tube (2, 12, 22) has a longitudinal axis (A) and a tube contour (8, 18, 28) with a first tube cross section in the end regions of the measuring tube (2, 12, 22), wherein the measuring tube (2, 12, 22) includes a narrowing having a second tube cross section, which differs in form and/or area from the first tube cross section, wherein the narrowing is divided into at least two segments (6, 16, 26), wherein at least one of the segments (6, 16, 26) is angled relative to the longitudinal axis (A) of the measuring tube (2, 12, 22) by an angle (α) of at least 5° and wherein, in each case, one of the temperature sensor elements is arranged in a respective one of the two segments (6, (Continued)

Figure 1:
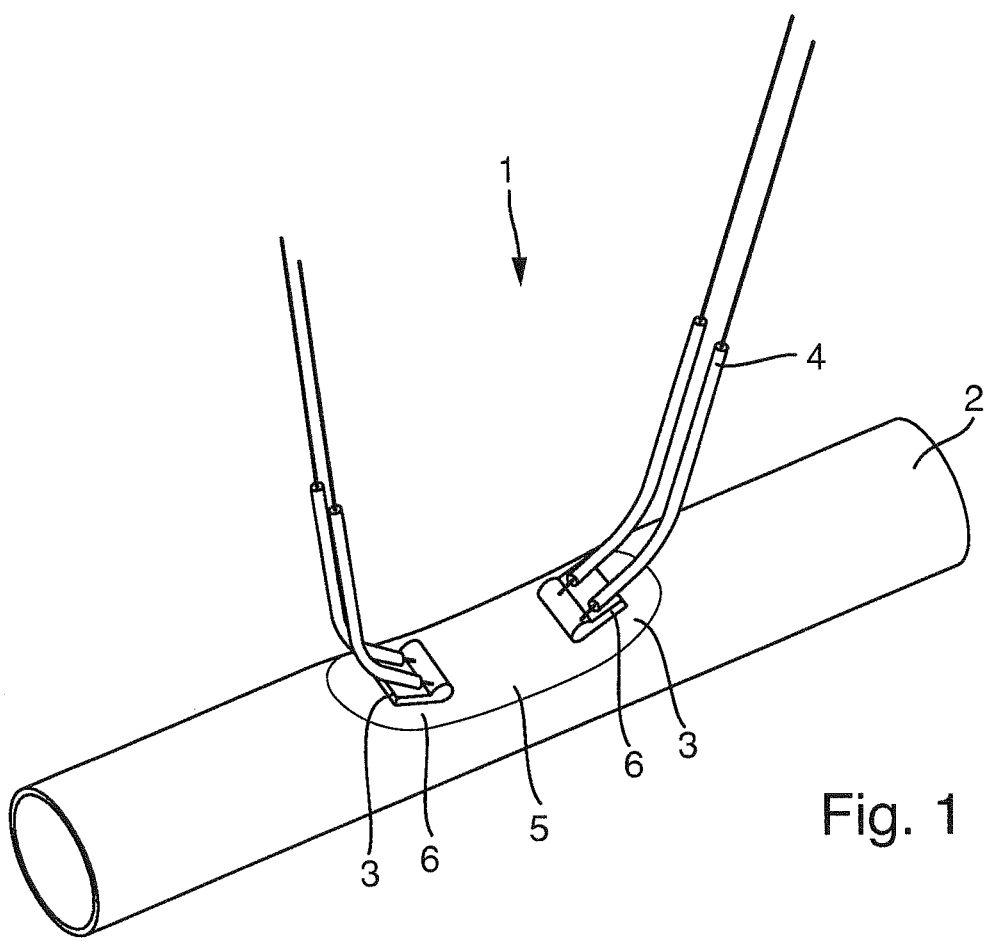

16, 26) externally on the tube wall (7, 17, 27) of the measuring tube (2, 12, 22) and is located in thermal contact with the measured medium.

11 Claims, 9 Drawing Sheets

(56) References Cited

U.S. PATENT DOCUMENTS

| | | | |
|---|---|---|---|
| 7,121,139 B2 * | 10/2006 | Shajii | G01F 1/6847 73/202.5 |
| 9,696,191 B2 | 7/2017 | Pfau | |
| 2006/0101907 A1 | 5/2006 | Shajii | |
| 2009/0139348 A1 | 6/2009 | Speldrich | |
| 2010/0154559 A1 | 6/2010 | Speldrich | |
| 2017/0356774 A1 | 12/2017 | Gaberthuel | |

FOREIGN PATENT DOCUMENTS

| | | |
|---|---|---|
| DE | 19725398 C1 | 4/1999 |
| DE | 10062612 A1 | 5/2002 |
| DE | 202006007237 U1 | 10/2006 |
| DE | 112005002770 T5 | 9/2007 |
| DE | 102013108099 A1 | 4/2014 |
| DE | 102014119556 A1 | 6/2016 |

OTHER PUBLICATIONS

International Search Report, EPO, The Netherlands, dated Apr. 4, 2016.
English Translation of the International Preliminary Report on Patentability, WIPO, Geneva, CH, dated Jul. 8, 2017.
Chinese Office Action in corresponding Chinese Application No. 201580070588.0, dated Jan. 28, 2019.

* cited by examiner

THERMAL, FLOW MEASURING DEVICE

The invention relates to a thermal, flow measuring device as defined in the preamble of claim 1.

Known are flow measuring device sensors, which work according to the thermal measuring principle. This measuring principle is based on the cooling of a heated resistance thermometer, subsequently also referred to as the heated and measuring or active sensor element, from which heat is withdrawn by the flowing, measured medium. The withdrawn energy is compensated by increasing the electrical heating current. In this way, a constant temperature difference is established between the heated and measuring, thus the active, sensor element and a reference temperature sensor, which is subsequently also referred to as a measuring or passive sensor element. The greater the mass flow, the more energy is required, in order to maintain this difference. The measured heating current is, as a result thereof, proportional to the mass flow. The thermal measuring principle is well established in processes, in which a product is made from a raw or starting material by the application of chemical, physical or biological procedures and is successfully applied in numerous applications. Especially demanding is the application of the measuring principle in water and other liquids, such as e.g. oil, since, in such case, heat transfers and the required heating power are significantly higher in comparison to gases and the relevant material properties are very strongly temperature dependent. In the case of velocities >2.5 m/s, a flattening of the characteristic curve can, therefore, be experienced, and therewith, a lessened sensitivity. Moreover, crosstalk from the active sensor element to the temperature measuring sensor element can be experienced, in given cases, at lesser separations of the sensor elements from one another, e.g. in the case of low velocities of <0.2 m/s.

Known are sensors, which are composed of two sensor elements, an active sensor element and a passive sensor element, each of which has a cylindrical sensor cap and extends from a base surface of a sensor. Soldered in the end face of the sensor caps are resistance sensors. Due to the cylindrical sensor caps, the sensor elements have a good thermal insulation and so no crosstalk occurs. These sensors have, however, a worse characteristic in water than the above mentioned sensors. Thus, in the case of rising flow velocity, the characteristic curve reaches comparatively rapidly a certain saturation, at which a maximum power can be fed. Upon reaching this power limit, in spite of higher velocity, no more heat can be fed into the flow. Since the characteristic curve shows the measuring range for the flow velocity of the medium, up to which a measuring can occur, in the case of a fast reaching of this saturation, measuring at faster flows is no longer possible.

DE 10 2013 108 099 A1 addresses this problem and describes a solution. In this publication, a sensor element, i.e. a sensor, is described, which is inserted via a nozzle radially into a pipeline. In such case, the sensor element uses no pin-shaped sleeves but, instead, a sensor cap with angled surfaces. The particular geometric embodiment of the sensor cap permits it to provide a flow profile with a tearoff edge and a defined recirculation zone. Since the diameter of the radially provided sensor part is greater than the tube diameter, a pipe-welded construction is very complicated.

It is, thus, an object of the present invention, based on DE 10 2013 108 099 A1, to achieve a measuring range expansion of a thermal, flow measuring device, an expansion which is applicable also in the case of pipe or tube systems of small diameter.

The object is achieved by a thermal, flow measuring device as defined in claim 1.

A thermal, flow measuring device of the invention for determining and/or monitoring a mass flow of a measured medium includes a sensor element having a measuring tube with a tube wall and with at least a first and a second temperature sensor element, which are especially embodied as resistance thermometers. These are arranged on the measuring tube. At least one of the temperature sensor elements is heatable.

The measuring tube has a longitudinal axis and a tube contour with a first tube cross section in the end regions. These end regions have a usual, normal tube contour. The end regions are especially the connector regions, by which the measuring tube is inserted into a process line. The measuring tube can be secured e.g. by welding or via flanges. Besides the sensor unit, the thermal, flow measuring device preferably includes also a measuring- and evaluation unit, which is usually embodied as a transmitter. The sensor unit is preferably protected by a housing against environmental influences.

The measuring tube includes additionally a narrowing having a second tube cross section, which differs in form and/or area from the first tube cross section. This difference is, of course, inherently present in the concept of a narrowing.

The narrowing is divided into at least two segments, which are angled relative to the longitudinal axis of the measuring tube by an angle of at least 5°. In this way, an optimized flow profile is achieved, e.g. with a tearoff edge. Alternatively to the longitudinal axis, also the measuring tube course in the longitudinal direction in the region of the normal tube contour can be utilized as reference system.

In each case, one of the temperature sensor elements is arranged in a respective one of the two segments externally on the tube wall of the measuring tube. The temperature sensor elements are located in thermal contact with the measured medium. That means they can exchange heat with the measured medium and can ascertain the temperature of the medium through the wall of the measuring tube. In such case, a metal tube wall is especially advantageous.

Due to the narrowing being an integral component of the measuring tube and due to the arrangement of the temperature sensor elements in this region, the thermal, flow measuring device can be cost effectively produced exactly in the case of applications with small nominal diameters. Due to the better handling in the manufacture, the device also measures exactly and has from flow device to flow device a constant measuring performance.

Advantageous embodiments of the invention are subject matter of the dependent claims.

For more extensive optimizing of the flow profile, it is advantageous that the narrowing be divided into at least three segments, a first segment, a middle segment and a third segment, wherein the segments are arranged sequentially and one after the other in the flow direction S. The temperature sensor elements are, in such case, arranged on the first and third segments.

For reasons of dematerialization and component reduction, it is advantageous that the narrowing be part of the tube wall.

The at least two segments, on which the temperature sensor elements are arranged, are especially embodied flat. The middle segment is likewise advantageously flat, and has a surface normal, which is perpendicular to the longitudinal axis of the measuring tube.

For good transfer of the heat, it is advantageous that the measuring tube wall be less than 1 cm thick, preferably less than or equal to 0.5 mm. Additionally, the contour of such a measuring tube wall can better undergo deformation forming. It is also possible to utilize a measuring tube with a thicker measuring tube wall and to configure thinly only the segments, in which the temperature sensor elements are arranged. This can be effected e.g. using a material removing, finishing step.

The embodiment of the flow measuring device of the invention offers special manufacturing advantages, when the tube contour of the measuring tube has a nominal diameter of less than DN20.

For providing a further optimized flow profile, it is advantageous when the measuring tube has two flat middle segments, which are diametrally opposite one another on the measuring tube and which have a surface normal, which extends perpendicular to the longitudinal axis of the measuring tube.

The narrowing with the at least two segments, in which the temperature sensor elements are arranged, can be advantageously implemented in a mass production viable manner by a deformation method. Of course, also larger tube wall regions can be embodied with more than two segments by the deformation method.

It is advantageous, when the surface normal vector of the inclined area of the first segment forms with the longitudinal axis (A) an angle (α) of at least 8°, especially preferably between 10-35°.

Figure 2:
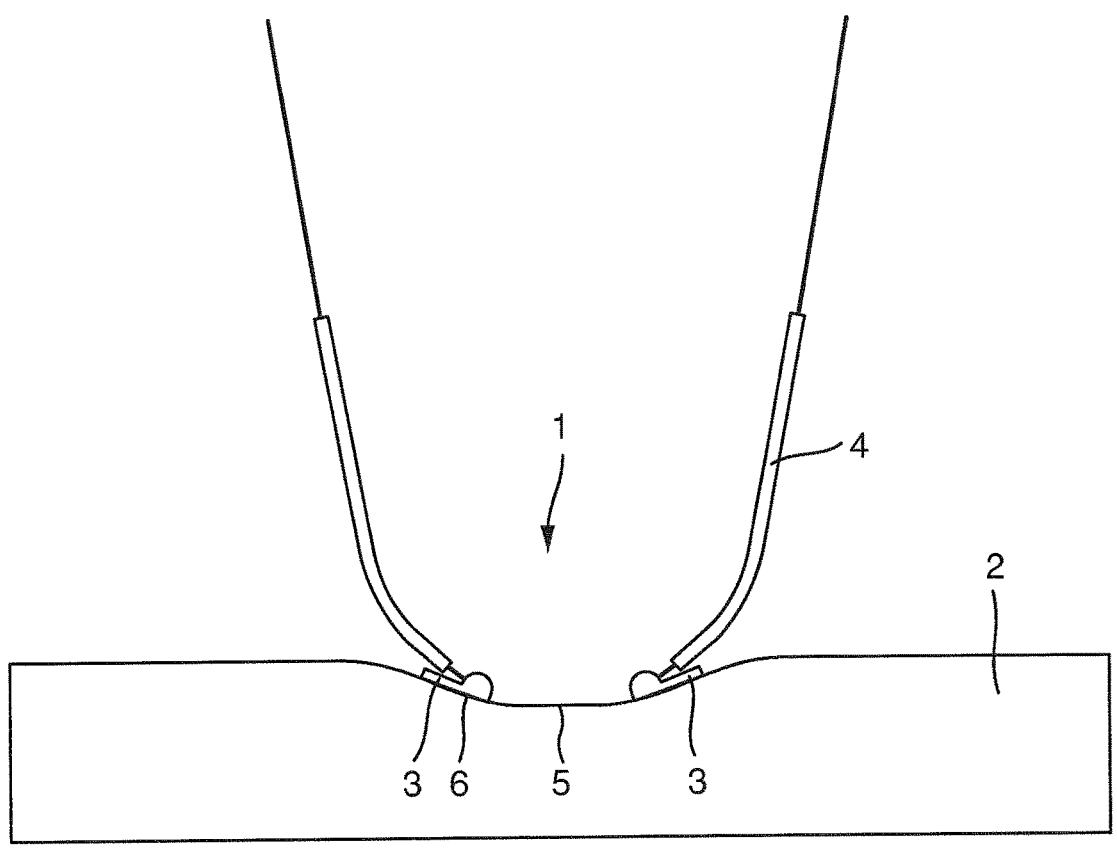
Figure 3:
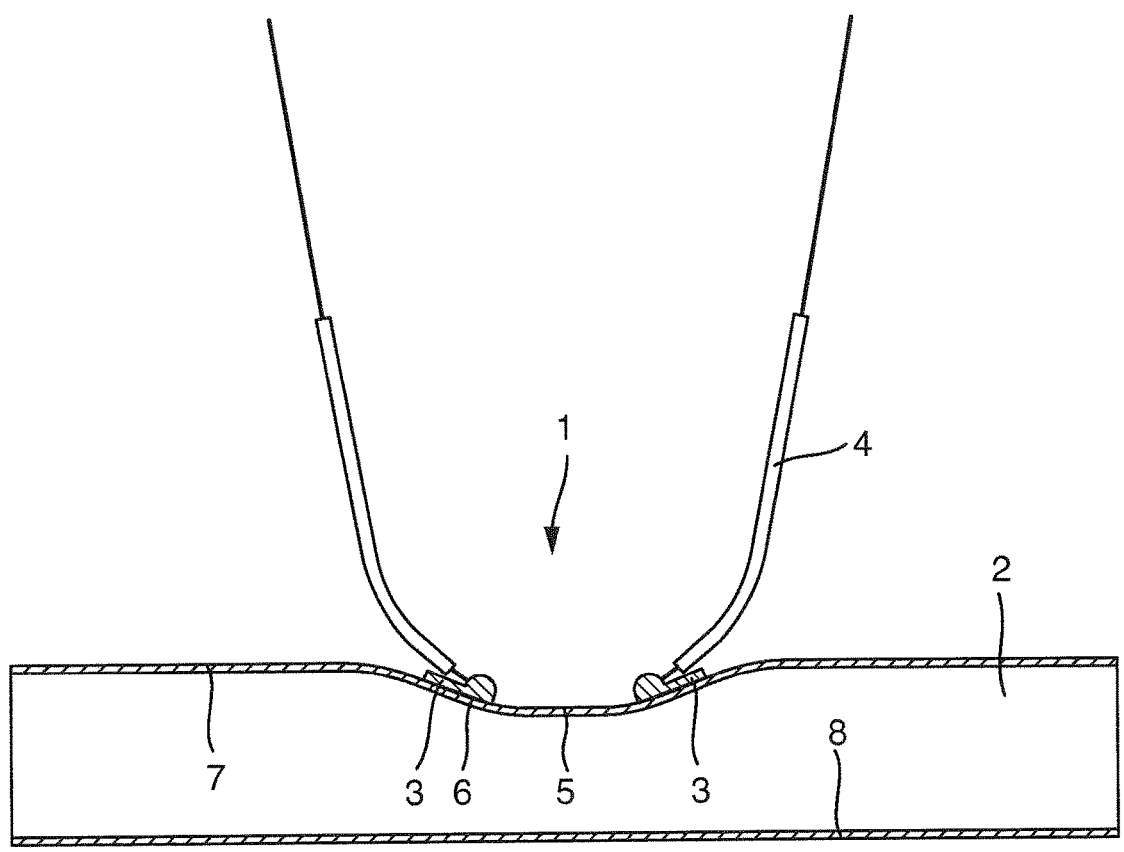
Figure 4:
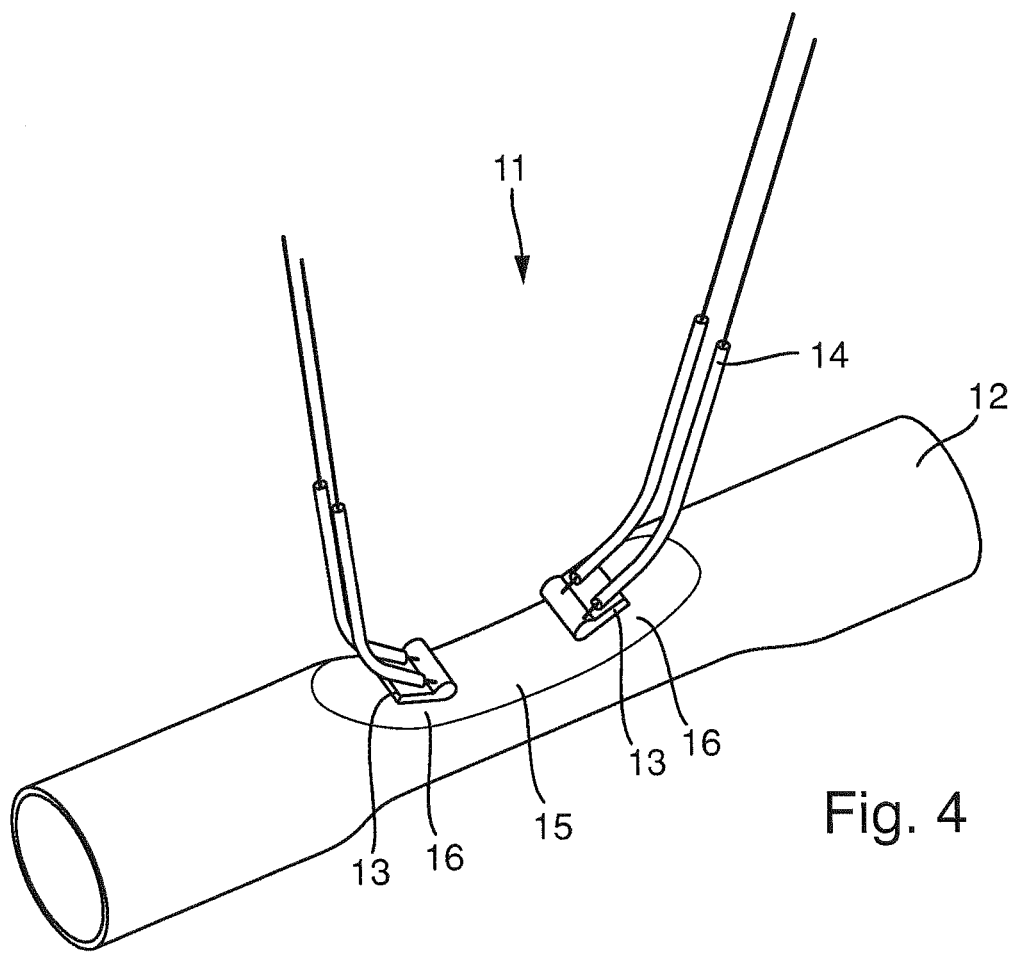
Figure 5:
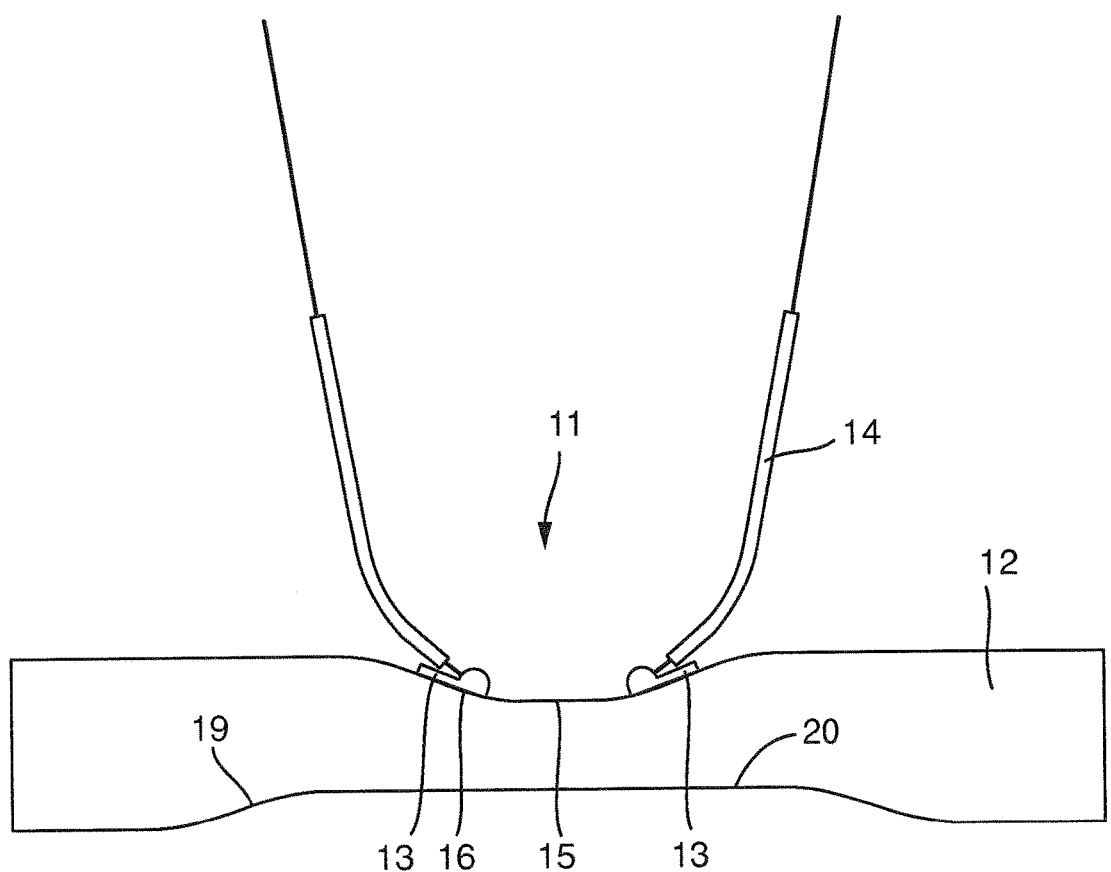
Figure 6:
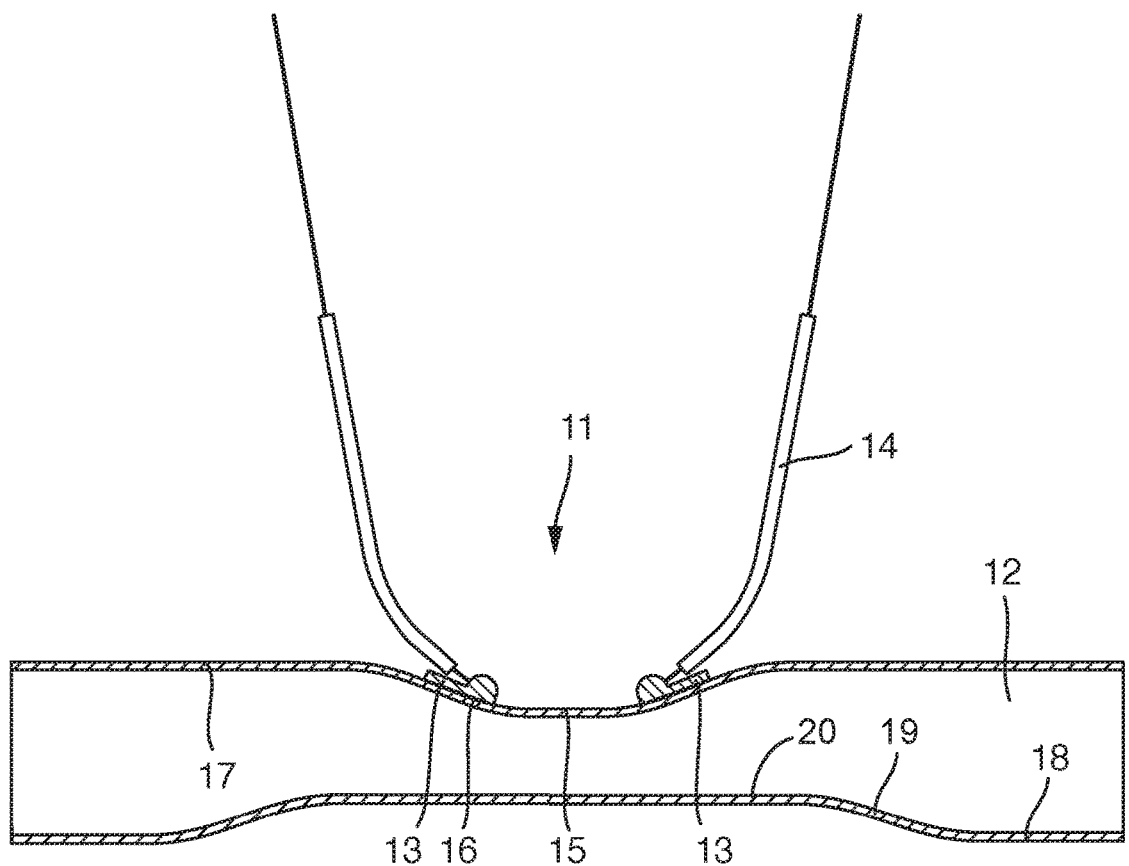
Figure 7:
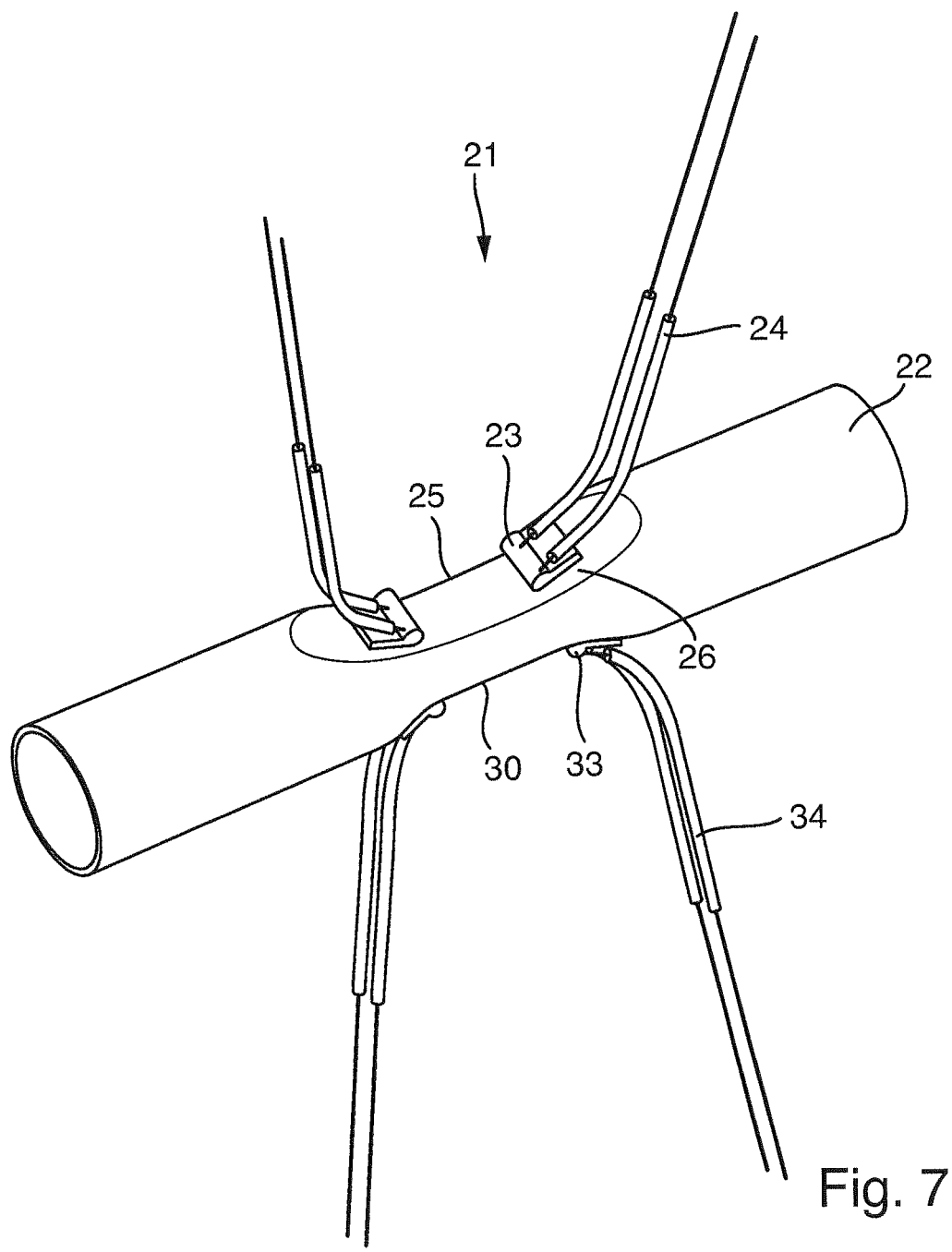
Figure 8:
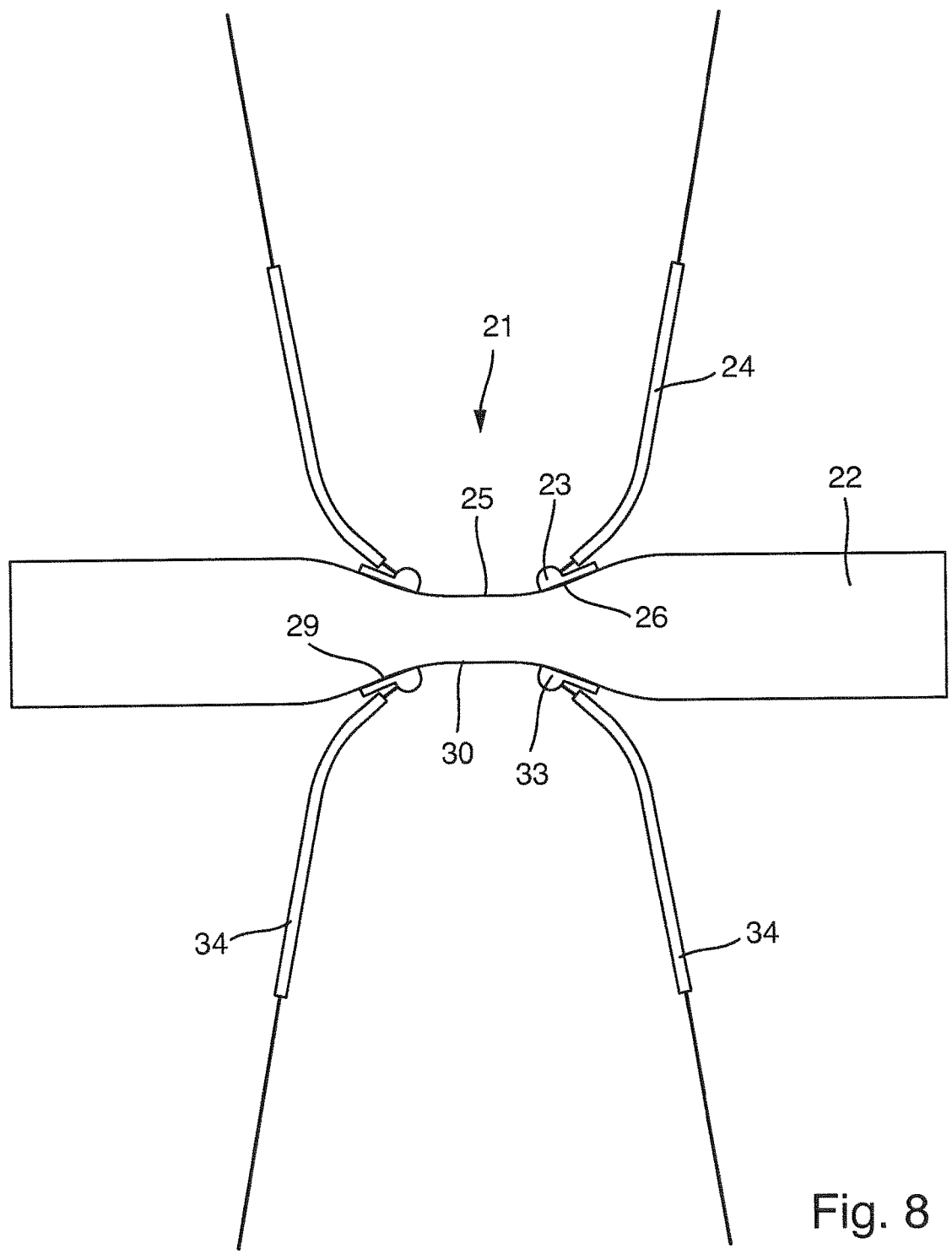
Figure 9:
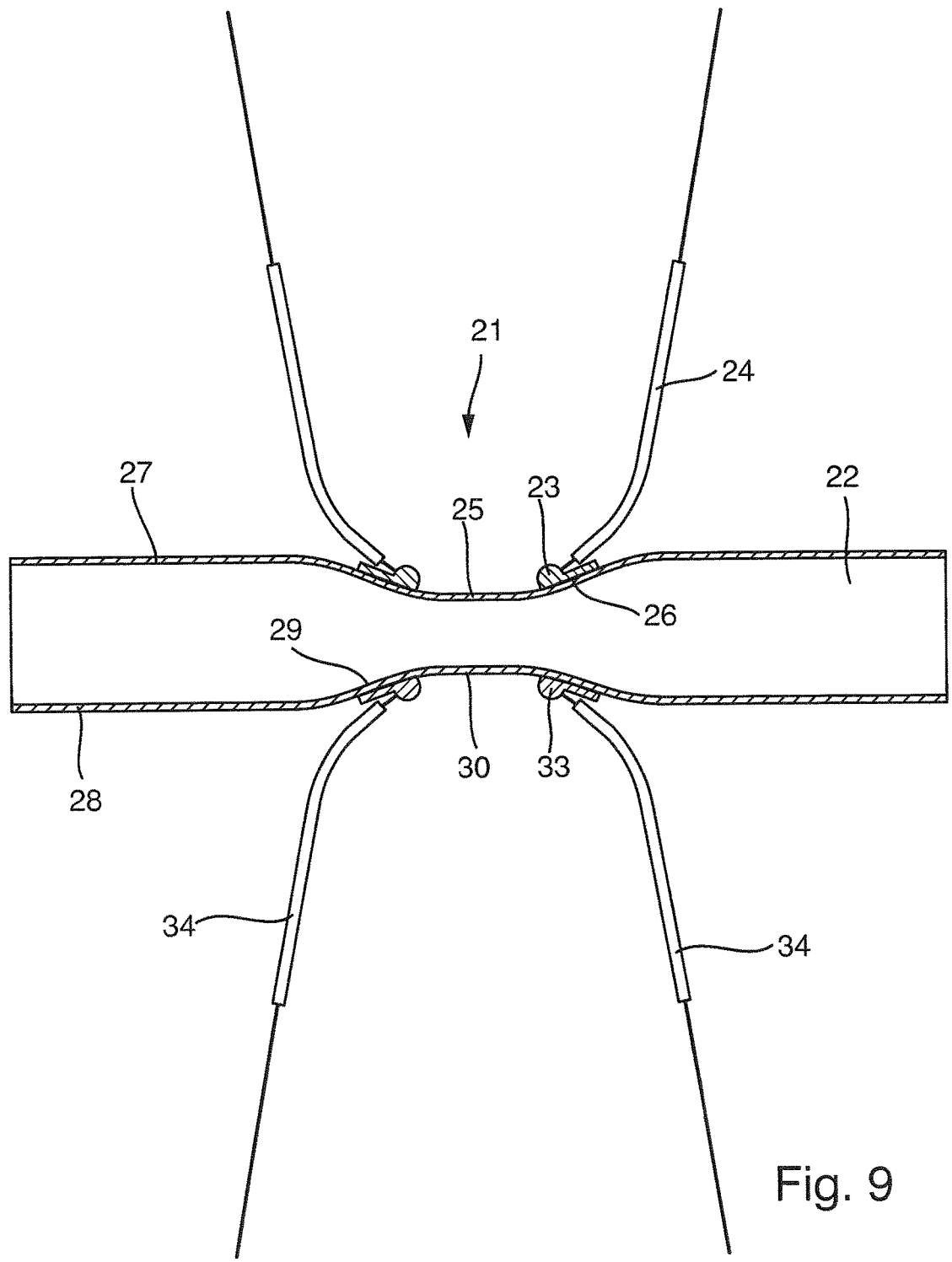

A number of examples of embodiments of the invention will now be described in greater detail based on the appended drawing, the figures of which show as follows:

FIG. 1 perspective view of a first embodiment of a sensor element of a thermal, flow measuring device of the invention;

FIG. 2 side view of a first embodiment of a sensor element of a thermal, flow measuring device of the invention;

FIG. 3 sectional view of a first embodiment of a sensor element of a thermal, flow measuring device of the invention;

FIG. 4 perspective view of a second embodiment of a sensor element of a thermal, flow measuring device of the invention;

FIG. 5 side view of a second embodiment of a sensor element of a thermal, flow measuring device of the invention;

FIG. 6 sectional view of a second embodiment of a sensor element of a thermal, flow measuring device of the invention;

FIG. 7 perspective view of a third embodiment of a sensor element of a thermal, flow measuring device of the invention;

FIG. 8 side view of a third embodiment of a sensor element of a thermal, flow measuring device of the invention; and FIG. 9 sectional view of a third embodiment of a sensor element of a thermal, flow measuring device of the invention.

FIGS. 1-9 show variants of sensor units 1, 11 and 21 for a thermal, flow measuring device. A measuring- and evaluation unit, e.g. in the form of a transmitter, is, for reasons of simplification, not shown in the figures.

A usual thermal, flow measuring device, so also in the present case, includes two as equally as possible embodied, heatable, resistance thermometers, which are in thermal contact with the medium flowing through a measuring tube or through the pipeline. For industrial application, the two resistance thermometers are usually installed in a measuring tube; the resistance thermometers can, however, also be directly soldered to the pipe. One of the two resistance thermometers is a so-called active sensor element, which is heated by means of a heating unit. The heating unit is either an additional resistance heater, or, in the case of the resistance thermometer, is a resistance element, e.g. in the case of an RTD-(Resistance Temperature Device) sensor, which is heated by conversion of an electrical power, e.g. by a corresponding variation of the measuring electrical current. The second resistance thermometer is a so-called passive sensor element: It measures the temperature of the medium.

Usually in a thermal, flow measuring device, a heatable resistance thermometer is so heated that a fixed temperature difference is established between the two resistance thermometers. Alternatively, it is also known to supply via a control unit a constant heating power.

If there is in the measuring tube no flow, then a constant amount of heat per unit time is required for maintaining the predetermined temperature difference. If, in contrast, the medium to be measured is moving, the cooling of the heated resistance thermometer is essentially dependent on the mass flow of the medium flowing past. Since the medium is colder than the heated resistance thermometer, the flowing medium transports heat away from the heated resistance thermometer. In order, thus, in the case of a flowing medium, to maintain the fixed temperature difference between the two resistance thermometers, an increased heating power is required for the heated resistance thermometer. The increased heating power is a measure of the mass flow, i.e. the mass flow of the medium through the pipeline.

If, in contrast, a constant heating power is fed in, then, as a result of the flow of the medium, the temperature difference between the two resistance thermometers lessens. The particular temperature difference is then a measure for the mass flow of the medium through the pipeline, or through the measuring tube, as the case may be.

There is, thus, a functional relationship between the heating energy needed for heating the resistance thermometer and the mass flow through a pipeline, or through a measuring tube. The dependence of the heat transfer coefficient on the mass flow of the medium through the measuring tube, or through the pipeline, is utilized in thermal, flow measuring devices for determining mass flow. Devices, which operate according to this principle, are sold by the applicant under the marks, 't-switch', 't-trend' and 't-mass'.

In ascertaining the mass flow, a thermal, flow measuring device can, in the case of measuring liquids, reach a highest power limit. Since liquids have, compared with gases, an essentially higher thermal conduction coefficient, there is at higher velocity a greater heat energy transported away from the surface of the active temperature sensor. In the case of increasing velocity of the medium, a saturation of the sensor characteristic curve, or the power upper limit, of the measuring electronics is rapidly reached, so that the measuring range of liquids is limited to low flow velocities. This disadvantage is overcome by the sensor embodiments of a thermal, flow measuring device as illustrated in FIGS. 1-9.

The sensor unit 1 shown in FIGS. 1-3 includes a measuring tube 2. The invention has special advantages for the manufacture of flow measuring devices with measuring tubes in the small nominal diameter range. This range concerns measuring tubes with nominal diameters of less than DN20. Corresponding measuring tubes 2 can, for example, have a nominal diameter of DN10, DN8 or DN6. The same is true for the embodiments of FIGS. 4-9.

Measuring tube 2 has a longitudinal axis and includes additionally a region, in which the measuring tube narrows. This narrowing is preferably introduced into the measuring tube 2 by a deformation method. Exactly in the case of measuring tubes with thin tube walls of less than 1 cm, preferably less than 5 mm, other embodiments, thus e.g. casting methods, cannot be applied for forming the measuring tube.

The narrowing of the measuring tube 2 of the sensor unit 1 illustrated in FIG. 1 includes a certain course analogous to DE 10 2013 108 099 A1. The narrowing includes a flat, middle segment 5, whose surface normal extends perpendicularly to the longitudinal axis A of the measuring tube.

Measuring tube 2 includes outside the narrowing a tube contour 8. This is cylindrical in most applications. In some applications, however, also tube contours with triangular, rectangular or polygonal cross sections are known. Also these are encompassed by the terminology, tube contour.

Measuring tube 2 includes in the region of the narrowing between the normal tube contour 8 and the middle segment 5 a first and a third segment 6, wherein the first segment 6 is arranged on the inflow end and the third segment 6 is arranged on the outflow end of the middle segment 5. These transitional regions are composed of angled surfaces, whose surface normals intersect the measuring tube axis A at an angle not equal to 90°. The first segment 6, the middle segment 5 and the third segment 6 are arranged next to one another.

In such case, at least the first segment in the sectional view of FIG. 3 is embodied as a flat area inclined relative to the longitudinal axis A and with reference to the longitudinal direction of the tube wall 7 of the measuring tube 2 at an angle α of preferably at least 5°, preferably at least 8°, especially preferably between 10-35°. FIG. 3 shows this angle as 20°. In such case, the area can especially be embodied flat, have irregularities due to surface roughness or extend in an arc shape toward the measured medium or away from the measured medium.

Arranged on the tube wall 7 of the first segment 6 is a first temperature sensor element with a first resistance thermometer 3, whose construction is described in the following in greater detail based on an example of an embodiment. Resistance thermometer 3 is preferably embodied as a thin layer element. Resistance thermometer 3 has a three layered construction, with a ceramic substrate, a meander shaped metal layer or metal wire, preferably of platinum, and a glass protective layer arranged thereover. Extending to the metal wire or the metal layer are supply and drain leads.

Temperature measurement occurs by exploiting the temperature dependence of an electrical resistance when carrying an electrical current. In this operating state, the resistance thermometer 4 is applied as passive sensor element. The above-described resistance thermometer 4 measures as passive sensor element the temperature of the medium and introduces as active sensor element with setting of the electrical current level also an amount of heat into the medium. In this case, the resistance thermometer 4 of the first segment 3 is an active sensor element, which has a constant temperature and outputs heat energy to the flowing medium.

This sensor element, i.e. resistance thermometer 4, is preferably constructed as a plate shaped, thin layer element. In an especially preferred embodiment of the invention, the plate-shaped, thin layer element is essentially oriented parallel to the area of the first segment 6. Small deviations of less than 10°, preferably less than 5°, to the parallel plane can occur.

A first embodiment will now be described, in which the first resistance thermometer 3, which is arranged on the tube wall 7 of the first segment 3, is operated as active sensor element. In such case, the inflow end segment 6 is the segment of the narrowing, against which the flow of the medium in the flow direction S first strikes.

In similar manner as the first resistance thermometer 3, preferably a second temperature sensor element with a second resistance thermometer 3 is arranged in the sensor element 1 on the tube wall 7 of the second segment 6. In such case, this second resistance thermometer 3 functions in the present first embodiment as passive resistance thermometer for registering the temperature of the medium.

Compared to the embodiments of DE 10 2013 108 099 A1, the resistance thermometers 3 are directly secured to the tube wall. This can occur e.g. by a soldered connection or by a heat conducting adhesive.

The measuring tube is composed, in such case, preferably of metal. Leading from each of the resistance thermometers 3 to a measuring- and evaluation unit (not shown) are two connecting wires 4 for energy supply and for signal transmission. The energy supply and the signal transmission can, however, also occur via separate connecting wires.

In order to guard against external temperature influences, the measuring tube with the resistance thermometers 3 is advantageously provided with a housing (not shown).

The effects achieved by the particular embodiment of the sensor 1 in combination with the active sensor element 3 arranged on the first segment 6 will now be explained in greater detail.

The inclination of the first segment 6 arranged on the inflow end increases the thermal boundary layer thickness compared to a flat surface, and a tightly adjoining boundary layer is formed comparatively uniformly distributed over the surface. This boundary layer reduces the heat emission of the active sensor element. In other words, the presence of the boundary layer lessens the temperature gradient between medium and sensor surface, whereby a lesser heat input occurs. Because of the boundary layer, the sensor requires a smaller power during measurement operation.

In a second preferred embodiment of the invention, the second resistance thermometer 3 of the downstream, third segment 6 is operated as active sensor element and the first resistance thermometer 3 of the upstream, first segment 6 as passive sensor element.

In the case of smaller flow velocities, a boundary layer structure occurs over the entire end face 3 of the sensor and an especially high layer thickness is present in the downstream region. This boundary layer enables, such as already described in the preceding example of an embodiment, a smaller heat input into the medium and therewith a delaying of the degree of saturation to higher flow velocities of the medium.

In the rear part at the transition between the middle segment 5 and the second, downstream segment 6, additionally, a tearoff edge is created, where the flow tears off at higher velocities. At the same time, in the case of increased velocity of the medium, a recirculation is created, thus a flow which is at least partially opposite the principal flow direction. This recirculation is slower, preferably at least 60% slower, especially preferably at least 80% slower, than the main flow. It is, however, proportional to the main flow. The part of the recirculation directed opposite to the main flow flows past the third segment below the transition, and below the tearoff edge, in the direction of the medium and absorbs, in such case, a smaller heat energy than would be the case for the main flow. In this way, less power is required for maintaining the temperature and a power saturation occurs only at very high flow velocities.

Thus, the optimized geometry of the sensor is based on two different phenomena, the forming of a flow velocity dependent recirculation in the downstream region in the case of high velocities and the forming of a unitary boundary layer in the inflow region.

In summary, the new sensor geometry delivers more stable and more reliable measured values than previous geometries.

The narrowing shown in FIGS. 1-3 is introduced into the measuring tube 2 by deformation from one side.

Another embodiment of a sensor element 11 according to the invention is shown in FIGS. 4-6. Here, the tube wall of the variant of FIGS. 1-3 is developed further by equipping it with a narrowing, which is introduced into the measuring tube both from one side, e.g. from above, as well as also from an oppositely lying side, e.g. from below.

In this embodiment, there are arranged in the region of the narrowing two flat middle segments 15 and 20, which are parallel to one another and which have surface normals, which are perpendicular to the longitudinal axis of the measuring tube 12. The middle segments 15 and 20 are, however, dimensioned differently long with reference to the propagation direction along the longitudinal axis A. For ascertaining the flow analogously to FIGS. 1-3, resistance thermometers 13 are arranged externally on the measuring tube wall 17 in the first and third segments 16. An arrangement externally on the measuring tube wall means that this surface of the measuring tube wall is not a medium-contacting surface. Of concern, thus, is an arrangement on the perimeter of the measuring tube, i.e. on the outer wall of the measuring tube.

Lying between the first and third segments 16, in such case, is the shorter of the two middle segments 15 and 20.

The tube contour 18 is also cylindrically embodied in this example. In the region of the narrowing, the shape of the measuring tube differs from this tube contour, wherein the measuring tube cross section lessens. The tube wall 17 of the measuring tube 12 is preferably transformed by a deformation method in such a manner that the middle segments are formed. Arranged between the middle segments 15 and 20 and the tube contour 18 are first and third segments 16, as well as fourth and sixth segments 19, which are preferably flat. Their surface normals have an angle from the longitudinal axis unequal to 90°. Especially, the surface normals of the segments 16 and 19 are not at 90° relative to the longitudinal axis. The first, third, fourth and sixth segments 16 and 19 have especially the same angle of inclination relative to the longitudinal axis L of the measuring tube 12 and relative to the length of the measuring tube wall 17. The second tube wall region with the neighboring fourth segment 19, the middle segment 20 and the sixth segment 19 lying opposite a first tube wall region with the neighboring first segment 16, the middle segment 15 and the third segment 16 has more surface area than the first tube wall region.

The introduction of the second tube wall region into the measuring tube can especially occur in a shared deformation step with the introduction of the first tube wall region and serves for additional flow conditioning.

FIGS. 7 to 9 show a further example of an embodiment of a sensor element 21 of the invention. Also here, the narrowing of the measuring tube 22 is effected by two tube wall regions, which, however, in this example of an embodiment are dimensioned equally and lie diametrically opposite one another.

In analogy to FIGS. 4-6, the measuring tube likewise includes two flat middle segments 25 and 30, which, in deviation from the normal cylindrical tube contour 28, are introduced into, preferably formed in, the measuring tube wall 27.

In the transitional regions of the respective middle segments 25 and 30, in each case, inclined, preferably flat, segments 26 and 29 are arranged. Arranged on these segments externally on the tube wall are temperature sensors 23 and 33, from which connection leads 24, 34 extend for energy- and signal transmission.

Via oppositely lying resistance thermometers 24 and 34, measurement error can be compensated and redundant measurements made for checking the accuracy of the flow measurement.

The effects, which result from the special geometry, are described and shown in detail in DE 10 2013 108 099 A1, to which comprehensive reference is taken in the context of the present application.

The sensor element shown in its different embodiments in FIGS. 1-9 is excellently suited for application in the case of flows with low pressures to, for instance, 40 bar. In such case, the sensor element has in the region of the narrowing a wall thickness of especially preferably 0.3-1 mm, especially 0.4-0.7 mm. The wall thickness is optimized for the response time of the sensor.

REFERENCE CHARACTERS

1, 11, 21 sensor element
2, 12, 22 measuring tube
3, 13, 23, 33 resistance thermometer
4, 14, 24, 34 lead for signal transmission and/or energy supply
5, 15, 25 first middle segment
6, 16, 26 first and/or third segment
7, 17, 27 tube wall
8, 18.28 tube contour
19, 29 fourth and/or sixth segment
20, 30 second middle segment
S flow direction
A longitudinal axis

The invention claimed is:
1. Thermal, flow measuring device for determining and/or monitoring a mass flow of a measured medium, comprising a sensor element having a measuring tube with a tube wall,
   wherein the measuring tube has a longitudinal axis and a tube contour with a first tube cross section in end regions of the measuring tube,
   wherein the measuring tube includes a narrowing having a second tube cross section, which differs in form and/or area from the first tube cross section,
   wherein the narrowing is divided into at least a first, a middle and a third segment,
   wherein at least the first segment comprises a flat area angled relative to the longitudinal axis of the measuring tube by an angle of at least 5° and
   wherein at least the first and third segment each comprises at least one temperature sensor element externally arranged on the tube wall of the measuring tube and located in thermal contact with the measured medium,
   wherein the temperature sensor element arranged in the first segment is arranged on the flat area,
   wherein the temperature sensor elements of the first and third segments are embodied as resistance thermometers, wherein at least one of the temperature sensor elements is heatable.

2. Thermal, flow measuring device as claimed in claim 1, wherein the first, the middle and the third segment are arranged sequentially and one after another in a flow direction.

3. Thermal, flow measuring device as claimed in claim 2, wherein the middle segment is embodied flat with a surface normal, which is perpendicular to the longitudinal axis of the measuring tube.

4. Thermal, flow measuring device as claimed in claim 1, characterized in that the narrowing is part of the tube wall.

5. Thermal, flow measuring device as claimed in claim 1, wherein the tube wall has a wall thickness of less than 1 cm.

6. Thermal, flow measuring device as claimed in claim 1, wherein the tube contour of the measuring tube has a nominal diameter of less than DN 20.

7. Thermal, flow measuring device as claimed in claim 1, wherein the measuring tube has two flat middle segments, which are diametrally opposite one another on the measuring tube and which have a surface normal, which extends perpendicular to the longitudinal axis of the measuring tube.

8. Thermal, flow measuring device as claimed in claim 1, wherein the narrowing with the at least two segments is introduced into the measuring tube by a deformation method.

9. Thermal, flow measuring device as claimed in claim 1, wherein at least one of the segments is angled relative to the longitudinal axis of the measuring tube by an angle ($\alpha$) of at least 8°.

10. Thermal, flow measuring device as claimed in claim 1, wherein the segments of the tube wall on which the temperature sensor elements are arranged have a wall thickness of less than 1 cm.

11. Thermal, flow measuring device as claimed in claim 1, wherein at least one of the segments is angled relative to the longitudinal axis of the measuring tube by an angle $\alpha$ between 10-35°.

* * * * *